Jan. 16, 1923.
H. LIVINGSTON.
WINDSHIELD FOR VEHICLES.
FILED FEB. 17, 1921.
1,442,624.
2 SHEETS—SHEET 1.
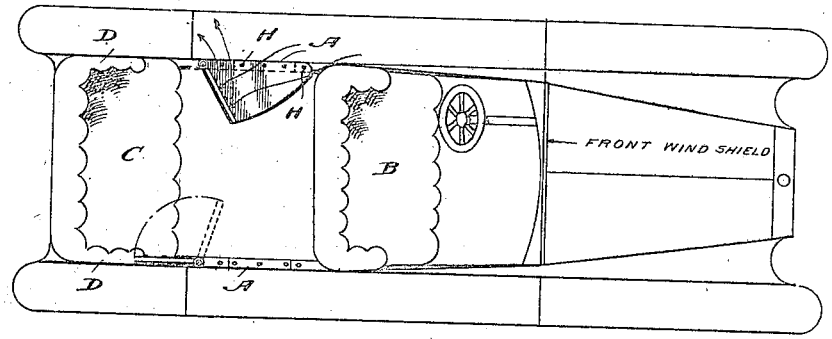
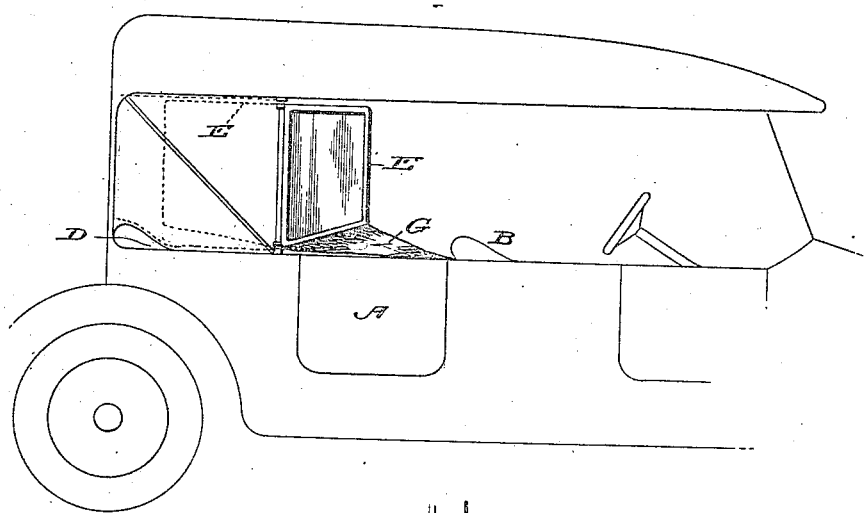
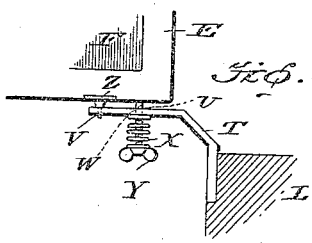
Inventor
Hall Livingston,
F. E. Stebbins,
Attorney

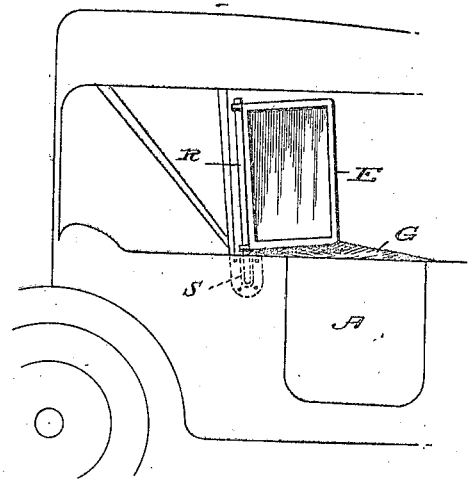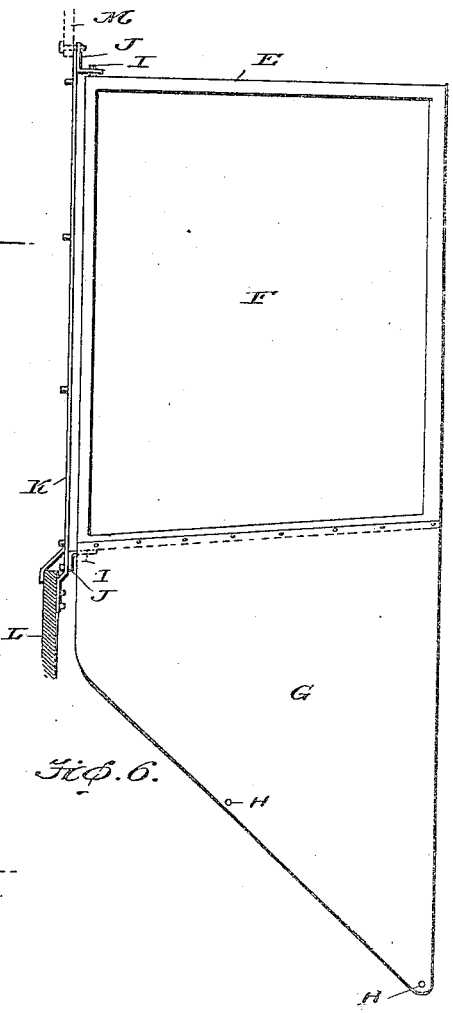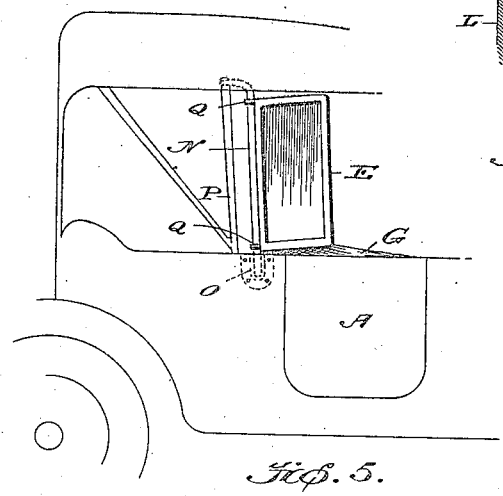

Patented Jan. 16, 1923.

1,442,624

UNITED STATES PATENT OFFICE.

HALL LIVINGSTON, OF AUBURN, CALIFORNIA.

WINDSHIELD FOR VEHICLES.

Application filed February 17, 1921. Serial No. 445,743.

*To all whom it may concern:*

Be it known that I, HALL LIVINGSTON, a citizen of the United States, residing at Auburn, in the county of Placer and State of California, have invented certain new and useful Improvements in Windshields for Vehicles; and I do hereby declare the following to be a full, clear, and exact description of the invention, such as will enable others skilled in the art to which it appertains to make and use the same.

The object of the invention is the provision of a windshield or two shields for two-seated automobiles or touring cars, and to protect the occupants of the rear seat from wind, dust and rain, said shield or shields to be so located and supported (1) that when in use there will be no obstruction to the free movement of the occupant or occupants of the rear seat; (2) that the shield or shields can be swung backwardly and occupy a position or positions parallel with the car side or sides and adjacent or above the arm rest or arm rests of the rear seat and out of the way so as not to interfere with the exit or entrance of the passenger or passengers; (3) that wind, rain and dust entering at the side or sides of the car will be deflected outwardly and away from the car body; (4) that an open space will be provided between the rear and front seats, permitting conversation and communication between an occupant of the rear seat and an occupant of the front seat; (5) that air striking the shield or shields will not be deflected against the back of the occupant of the front seat; and (6) that when provided with a curtain or curtains attached to the lower edge or edges of the shield or shields will prevent wind, rain and dust passing below or beneath the shield or shields and striking the occupant or occupants of the rear seat.

With these main objects in view, the invention consists, generally, in certain novelties of construction and in the combinations and arrangements of parts as herein set forth and claimed.

More specifically, the invention consists in locating at opposite sides of the car and between each side door and the rear seat or at or near the corners of the seat two wind deflecting shields, one at each side, each of said shields hinged or pivoted in a substantially vertical axis or position at one edge thereof, that edge adjacent the car side, so it can swing from a position parallel with the car side, and in some cases from above an arm rest or upholstering, to a position oblique to the horizontal axis or side wall of the car body and in front of the occupant of the rear seat on the same side of the car to which the shield is pivoted or hinged.

Further, it consists of a shield located and having a movement as described combined with a curtain to prevent wind, rain or dust passing beneath the lower edge of the shield when the shield is turned to an oblique position as described and in use.

The accompanying drawings illustrate an example of the embodiment of the invention, several ways of pivotally supporting each shield at a side edge so it can swing in the arc of a circle being shown, the parts being constructed and combined according to the best mode of procedure I have so far devised for the purpose.

Figure 1 is a top plan view of an automobile showing the shields applied, one shield being in the position it occupies when in use and the other shield in the position it occupies when not in use.

Figure 2 is a side view in elevation showing one shield in use, and in dotted lines its position when not in use.

Figure 3 is a detail view showing a means for locking the shield when in use or not in use.

Figure 4 is a side view in elevation showing a shield in use and hingedly supported at top and bottom upon a rod or post, the lower end of which rod is detachably located in a socket attached to the car.

Figure 5 is a side view in elevation showing a shield in use and hinged at the top and bottom to a rod or post which is supported at the bottom by the car side and at the top by some fixed part of the top frame.

Figure 6 shows in side elevation one of the shields and an attached curtain and another way of pivoting the shield at the top and bottom.

The illustrations show parts of the body of a two-seated automobile which may be of any type having rear doors A, a front seat B and a rear seat C, the rear seat preferably upholstered at the ends or with arm rests D of any shape or configuration.

Referring to Figure 6, which shows one of the shields detached, E is a frame; F, glass or other transparent material; G, a curtain secured at one edge to the lower part of the sash of the frame; H, parts of fastening devices, such as snap buttons, to engage complemental parts on the door, car side or front seat, as desired; and I I are pintles at the corners of the frame which are located in bearing holes in brackets J J, said brackets being supported by a bar or strap iron K attached at its lower end to the car side wall L and at its top end to some fixed part M of the car top.

A special feature of construction of the shield is its shape, the lower edge not being in a horizontal line, but oblique or slanting upwardly from the lower hinge or pintle to the free front edge, as shown. This construction allows the shield to swing to a position out of use and parallel with the car wall without coming in contact with the seat end upholstering or arm rest. The lower edge of the shield should in any particular case be fashioned to such a shape that it will not engage the upholstering when turned to a position parallel with the car side. The upwardly slanting position of the lower edge of the shield has a further advantage, for when the curtain is in use its top surface will slope outwardly towards the car side and more effectively deflect air, dust and rain outwardly from the inside of the car.

This Figure 6 illustrates one way only of hinging and supporting a shield in the desired position.

Figure 5 shows another way of hinging and supporting the shield. In this case N is a rod or post with its lower end seated in a socket O attached to the car wall on the inside surface, and its top end secured, for example, to a top bow or member P in any desirable way. The shield is hinged at Q, Q to the rod or post N so it can freely swing in the arc of a circle.

Figure 4 shows a shield hingedly supported on a post R, which post has its lower end detachably seated in a socket S on the inside surface of the car wall, as shown.

Any suitable anchoring means may be employed to hold a shield in position when in use or not in use. In Figure 3 is shown one such means. A bracket T is secured at one end to the car side and said bracket has two holes U and V. A pin or journal W carried by the sash of the shield near the corner passes through hole U and on the threaded end thereof is a spring X and an adjustable threaded nut Y. A plate Z on the sash is provided with a projection which is loosely seated within hole V. The spring allows the shield to be bodily lifted with the plate Z, withdrawing the projecting element from hole V so the shield can be turned upon its pivotal axis. However, any anchoring means can be selected to hold a shield in a position in use or not in use. Obviously, when in use the curtain G, secured to the side or top of the door or car side at its free edge, will hold the shield at an angle to the longitudinal axis of the car when currents of air impinge upon the shield.

When an occupant of the rear seat desires to alight the curtain is detached at its edge from the door or wall, then folded up under the shield and turned backwardly with the shield to a position above the end of the seat.

The ordinary car curtains are present and in position when desired and may form with the wind shield a close connection for a joint or joints so currents of air cannot pass, as will be understood.

It will be noted that the positions or locations of the shields relative to the rear seat and the side walls of the car are especially advantageous and superior to any other location. Each shield when in use is far enough in front of the occupant of the seat to afford unobstructed freedom of movement and at the same time protect the said occupant from currents of air. The pivotal position allows the body of the shield to turn to a position parallel with the side of the car over the padded side of the rear seat and adjacent the top supporting bows or rods, where it is out of the way of the passenger occupying the seat. The location of the shield does not interfere with easy access to and exit from the car. When in use the currents of air are deflected outwardly from the car and not against the back of the occupant of the front seat. When both shields are in use an open space is provided for communication with an occupant of the front seat. Each shield is less in the way when in use or not in use than any other type affording an equal protection of the passenger.

From the description and drawings it is clear that I have provided means for protecting the occupants of the rear seat of a car from wind, rain and dust, which fulfills the conditions set forth as the object of the invention.

In the embodiment of the invention numerous changes and modifications may be introduced without constituting substantial departures. Other means than those shown may be employed to pivot the shields in vertical positions, each either at the bottom only or at both top and bottom, and to anchor the shield at a particular angle oblique to or parallel with the car side. The lower edge of each shield may be fashioned to correspond with the particular shape of the upholstered arm rest or upholstery when present so the shield may turn to a position parallel with the wall when not in use. The shield itself may be in attached parts, of any desired width or dimensions and constructed otherwise than shown, with or without transparent material. These and other changes and alterations and additions may be introduced in practice and the invention still be embodied.

What I claim is:

1. The combination with a car having fastening devices in front of the rear seat for a curtain, of a wind shield pivoted or hinged at one edge and in a substantially vertical axis, said axis being located at the side of the car and adjacent to the front end corner of the rear seat, and a curtain having fastening devices; the lower edge of said shield being fashioned to slant upwardly from the pivotal edge, and one edge of said curtain being secured to the lower upwardly slanting edge of the shield and another edge to the said fastening devices on the car in front of the shield, the said curtain lying in a plane at an angle to the plane of the shield when the shield is in a position oblique to the longitudinal axis of the car, whereby air, dust, and rain will be deflected by the shield and curtain outwardly and away from the interior of the car.

2. The combination with a vehicle having a rear seat with arm rests or supports, of a wind shield pivoted at one edge to the vehicle adjacent to a front end corner of the said seat, the lower edge of said shield being fashioned to slant upwardly from the pivotal edge of the shield so the same can be turned to a position above the arm rest or support and parallel with the vehicle side wall.

In testimony whereof I affix my signature.

HALL LIVINGSTON.

Witnesses:
JOHN A. LIVINGSTON,
R. E. BENEDICT.